United States Patent
Fuse (10) Patent No.: US 9,575,271 B2
(45) Date of Patent: Feb. 21, 2017

(54) CABLE WITH OPTICAL FIBER FOR PRESTRESSED CONCRETE

(75) Inventors: Kenichi Fuse, Hadano (JP); Machiko Fuse, legal representative, Hadano (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 248 days.

(21) Appl. No.: 14/000,198

(22) PCT Filed: Nov. 1, 2011

(86) PCT No.: PCT/US2011/058725
§ 371 (c)(1),
(2), (4) Date: Apr. 14, 2014

(87) PCT Pub. No.: WO2013/066315
PCT Pub. Date: May 10, 2013

(65) Prior Publication Data
US 2015/0077740 A1    Mar. 19, 2015

(51) Int. Cl.
*G02B 6/44*     (2006.01)
*G01B 11/16*    (2006.01)
*G01M 11/00*    (2006.01)

(52) U.S. Cl.
CPC ............ *G02B 6/4415* (2013.01); *G01B 11/16* (2013.01); *G01M 11/33* (2013.01); *G02B 6/443* (2013.01); *G02B 6/4416* (2013.01)

(58) Field of Classification Search
CPC .... G02B 6/443; G02B 6/4416; G02B 6/4415; G02B 6/4403; G02B 6/4427; G02B 6/4422; G02B 6/4402; G02B 6/4432; G02B 6/02395; G02B 6/4433; G02B 6/4401; G01B 11/16; G01B 11/18; G01B 11/00
USPC ........................................ 356/73.1
See application file for complete search history.

(56) References Cited

U.S. PATENT DOCUMENTS

| | | | |
|---|---|---|---|
| 3,922,437 A | 11/1975 | Kitta et al. | |
| 4,050,230 A * | 9/1977 | Senoo | D07B 1/025 57/231 |
| 4,082,423 A * | 4/1978 | Glista | G02B 6/4434 174/70 R |
| 4,200,787 A | 4/1980 | Carson | |
| 4,226,504 A * | 10/1980 | Bellino | G02B 6/4414 385/104 |
| 4,241,979 A * | 12/1980 | Gagen | G02B 6/443 385/107 |
| 4,304,462 A * | 12/1981 | Baba | G02B 6/4415 385/107 |
| 4,365,865 A * | 12/1982 | Stiles | G02B 6/4416 174/70 R |

(Continued)

OTHER PUBLICATIONS

International Search Report issued on the corresponding PCT Application No. PCT/US2011/058725, dated Jun 22, 2012.

(Continued)

*Primary Examiner* — Tarifur Chowdhury
*Assistant Examiner* — Mohamed K Amara
(74) *Attorney, Agent, or Firm* — Dorsey & Whitney LLP (57) ABSTRACT

A reinforcing cable for a prestressed concrete structure is disclosed. The cable has an optical fiber entwined between the twisted wire ropes that form the cable. The optical fiber facilitates in situ monitoring of cable integrity by comparing optical signal transmission over time.

26 Claims, 6 Drawing Sheets

(56) References Cited

U.S. PATENT DOCUMENTS

| | | | | |
|---|---|---|---|---|
| 4,370,023 A | * | 1/1983 | Lange | G02B 6/4427 264/1.28 |
| 4,534,618 A | * | 8/1985 | Bruggendieck | G02B 6/443 174/113 R |
| 4,550,976 A | * | 11/1985 | Cooper | G02B 6/441 385/103 |
| 4,647,151 A | * | 3/1987 | Grogl | G02B 6/4407 385/109 |
| 4,659,174 A | * | 4/1987 | Ditscheid | G02B 6/4402 174/113 AS |
| 4,701,016 A | * | 10/1987 | Gartside, III | G02B 6/4401 174/110 SR |
| 4,715,676 A | * | 12/1987 | Sutehall | G02B 6/4427 385/103 |
| 4,765,712 A | * | 8/1988 | Bohannon, Jr. | G02B 6/443 385/111 |
| 4,778,246 A | * | 10/1988 | Carroll | D07B 1/068 174/115 |
| 4,805,981 A | * | 2/1989 | Gould | G02B 6/4416 264/1.28 |
| 4,913,515 A | * | 4/1990 | Braunmiller | G02B 6/4403 385/109 |
| 5,016,973 A | | 5/1991 | Hager et al. | |
| 5,050,959 A | * | 9/1991 | Randisi | C10M 161/00 358/901.1 |
| 5,173,960 A | * | 12/1992 | Dickinson | G02B 6/4403 174/121 A |
| 5,189,720 A | | 2/1993 | Murai et al. | |
| 5,224,192 A | * | 6/1993 | Wagman | G02B 6/443 385/109 |
| 5,325,457 A | * | 6/1994 | Bottoms, Jr. | G02B 6/4419 385/100 |
| 5,345,525 A | * | 9/1994 | Holman | G02B 6/441 385/104 |
| 5,374,821 A | | 12/1994 | Muhs et al. | |
| 5,505,773 A | | 4/1996 | Vitands et al. | |
| 5,519,211 A | * | 5/1996 | Bur | B29C 35/0288 250/227.19 |
| 5,561,730 A | * | 10/1996 | Lochkovic | G02B 6/4408 385/110 |
| 5,627,932 A | * | 5/1997 | Kiel | G02B 6/441 385/102 |
| 5,656,783 A | * | 8/1997 | Frisch | G01L 1/24 73/800 |
| 5,761,362 A | * | 6/1998 | Yang | G02B 6/441 385/109 |
| 5,825,957 A | * | 10/1998 | Song | G02B 6/4407 385/110 |
| 5,838,864 A | * | 11/1998 | Patel | G02B 6/443 385/107 |
| 5,841,130 A | * | 11/1998 | Ahmad | G01B 11/18 250/227.14 |
| 5,902,962 A | | 5/1999 | Gazdzinski | |
| 6,122,427 A | | 9/2000 | Yokokawa et al. | |
| 6,236,789 B1 | * | 5/2001 | Fitz | G02B 6/4416 385/100 |
| 6,349,161 B1 | * | 2/2002 | Gleason | G02B 6/4427 385/113 |
| 6,389,204 B1 | * | 5/2002 | Hurley | G02B 6/4432 385/102 |
| 6,496,629 B2 | * | 12/2002 | Ma | G02B 6/4427 385/113 |
| 6,553,167 B2 | * | 4/2003 | Hurley | G02B 6/4432 385/102 |
| 6,853,781 B2 | * | 2/2005 | Chastain | G02B 6/4401 385/109 |
| 6,968,106 B2 | | 11/2005 | Chastain et al. | |
| 7,221,833 B2 | * | 5/2007 | Park | G02B 6/4401 385/100 |
| 8,149,394 B2 | * | 4/2012 | Burchardt | F03D 11/00 356/237.1 |
| 8,362,359 B1 | * | 1/2013 | Laws | G02B 6/4435 174/117 F |
| 8,571,369 B2 | * | 10/2013 | Tatat | G02B 6/443 385/111 |
| 8,879,877 B2 | * | 11/2014 | Keller | G02B 6/4486 385/103 |
| 8,886,000 B2 | * | 11/2014 | Register, III | G02B 6/4416 385/101 |
| 8,909,012 B2 | * | 12/2014 | Register, III | H01B 11/22 385/10 |
| 8,929,702 B2 | * | 1/2015 | Varkey | G02B 6/4416 385/100 |
| 9,069,148 B2 | * | 6/2015 | Herbst | G02B 6/4416 |
| 9,188,756 B2 | * | 11/2015 | Register, III | G02B 6/4416 |
| 2002/0001441 A1 | | 1/2002 | Avellanet | |
| 2004/0063812 A1 | | 4/2004 | Sohal | |
| 2005/0078922 A1 | * | 4/2005 | Sanders | H01B 7/324 385/101 |
| 2014/0023331 A1 | * | 1/2014 | Lim | G02B 6/443 385/113 |
| 2015/0153531 A1 | * | 6/2015 | McAlpine | G02B 6/4413 385/102 |

OTHER PUBLICATIONS

SE Co. bridge strengthening method by outside cable system: http//www.e-bridge.jp/eb/introref/pro_100005/summary.php downloaded on Feb. 27, 2013, 5 pages.

Reinforcement by a cable out of the PC girder was damaged by seawater [B-05]: http://www.easykanri.com/useful/img/pdf/b-05.pdf downloaded on Feb. 27, 2013, 1 page.

* cited by examiner

CABLE WITH OPTICAL FIBER FOR PRESTRESSED CONCRETE

This application is the U.S. National Phase under 35 U.S.C. §371 of International Application No. PCT/US2011/058725, filed Nov. 1, 2011.

BACKGROUND

Unless otherwise indicated herein, the materials described in this section are not prior art to the claims in this application and are not admitted to be prior art by inclusion in this section.

Increasing carbon dioxide ($CO_2$) gas in the atmosphere possibly affects environmental changes. For example, the increase of $CO_2$ gas is known to cause carbonation or neutralization of concrete when the hydrogen ion concentration becomes pH 9 or less.

Due to a porous structure of concrete with numerous pores and voids, moisture, chloride ions, carbon dioxide, oxygen, etc., may permeate throughout the concrete by capillary action through the pores and voids. Normal concrete, which is strongly alkaline, is neutralized by the reduction of hydroxide ($OH^-$) ions due to permeation of $CO_2$ gas and chloride compounds from salinity corrosion. This neutralization of concrete does not directly cause a decrease in the strength of the concrete itself. However, reinforcing steel for supporting various structures contained in the concrete can be severely damaged. For example, when $CO_2$ gas and chloride ($Cl^-$) ions in the atmosphere reach the reinforcing steel inside the concrete from the surface, a passivation layer, typically having the thickness of approximately 3 mm, on the surface of the reinforcing steel can be corroded, resulting in rust on the surface of the reinforcing steel. These corrosions and rust can cause the expansion of the volume of the passivation layer on the reinforcing steel by approximately two to three times. The expansion of the volume of the passivation layer burdens the surrounding concrete with extra stress, thus the strength of the whole concrete structure deteriorates due to the extra stress.

To avoid the deterioration of the concrete structure, a prestressing cable reinforcement method has been recently employed. In this method, prestressed concrete with a predetermined level of pressure applied in advance, and various reinforcing cables attached to the exterior of the prestressed concrete are employed instead of reinforcement materials, such as reinforcing steel, to be contained in the concrete structure. In the prestressing cable reinforcement method, it is desirable to ensure the long-term integrity of the installed reinforcing cables by establishing a maintenance method for monitoring the cable integrity.

The reinforcing cables can be made of various types of steel, surrounded by protective coatings of various plastic materials, such as polyethylene, in order to prevent corrosion of the passivation layer due to permeation of $CO_2$ and/or $Cl^-$ and possible degradation due to exposure to the outdoor atmosphere after installation. However, these plastic materials may have cracks in the protective coating as a result of many different natural causes that accelerate deterioration, such as heat, moisture, ultraviolet rays from the sun and oxidation due to nitrogen oxide ($NO_R$) gas or sulfur oxide ($SO_x$) gas in the atmosphere, as well as human-induced causes, such as mechanical damage. Thus, there is a need for monitoring the integrity of the installed reinforcing cables without destroying or otherwise compromising the protective plastic coating.

SUMMARY

A reinforcing cable is disclosed in accordance with one embodiment of the disclosure. The cable includes one or more wire ropes twisted together, each wire rope comprising a plurality of wire strands twisted together, and one or more optical fibers entwined with and contacting at least some of the one or more twisted wire ropes, each optical fiber comprising a core configured to transmit an optical signal and a cladding around the core.

In some embodiments, the cable may further contain a plastic coating surrounding the cable. In some embodiments, each wire strand may include a straight solid-core wire or a twisted multi-stranded wire. In some embodiments, at least one wire strand may be coated in a plastic. In some embodiments, the plastic may be selected from the group consisting of polyolefins, nylon, Teflon and copolymers thereof. In some embodiments, the polyolefin may be selected from the group consisting of polyethylene, polypropylene, polybutylene and copolymers thereof. In some embodiments, the plastic may further contain carbon black, an antioxidant, or a combination thereof. In some embodiments, the plurality of wire strands may be selected from the group consisting of PC (Prestressed Concrete) steel wire, PC twisted steel wire, PC hard steel wire, and any combination thereof.

In another embodiment of the reinforcing cable, the cable may further include a nonwoven fabric wrapped around the one or more wire ropes and optionally the one or more optical fibers, and a plastic coating around the nonwoven fabric. In some embodiments, the cable may further include a filling agent in the gaps between the one or more twisted wire ropes and the one or more optical fibers. In some embodiments, the filling agent may contain epoxy resin, varnish, rosin wax, a gel of petroleum based oil or a combination thereof. In some embodiments, the filling agent may further contain silica. In some embodiments, the filling agent may further contain sodium salt.

In one embodiment, the plastic coating surrounding the cable may be selected from the group consisting of polyolefins, nylon and Teflon and copolymers thereof. In another embodiment, the plastic coating may further contain carbon black, an antioxidant, or a combination thereof.

In a further variation, a ratio of a refractive index of the core to a refractive index of the cladding of the one or more optical fibers is less than about 1.0%. In some embodiments, the cable may include from 1-18 twisted wire ropes. In some embodiments, the cable may include 6 outer wire ropes surrounding 1 central core wire rope.

A system for in situ monitoring of cable integrity in externally reinforced prestressed concrete is disclosed in accordance with other embodiments. The system includes one or more reinforcing cables. Each reinforcing cable includes one or more wire ropes twisted together, each wire rope comprising a plurality of wire strands twisted together, and one or more optical fibers entwined with and contacting at least some of the one or more wire ropes, each optical fiber comprising a core which transmits an optical signal and a cladding around the core. The system also includes an optical signal transmitter which emits an optical signal at a first end of the one or more optical fibers at a first time and a second time, an optical signal receiver which receives the optical signal at a second end of the one or more optical fibers, and a signal monitor, coupled to the optical signal receiver, which identifies changes in signal transmission through the one or more optical fibers between the first and second times.

In variations to the system, the optical signal transmitter may comprise a laser. In some embodiments, the optical signal receiver may include a photodiode. In further variations, the signal monitor further controls the optical signal generator and automatically monitors signal transmission over time. In some embodiments, the signal monitor is coupled to the signal receiver by a wire or by a wireless connection. In another embodiment, the signal monitor further includes at least one output device selected from the group consisting of a display, a printer and an alarm.

A method of monitoring integrity of reinforcing cables used for externally reinforcing a prestressed concrete structure is disclosed in accordance with other embodiments. The method includes: providing one or more reinforcing cables, each reinforcing cable comprising one or more wire ropes twisted together, and one or more optical fibers entwined with and contacting at least some of the one or more twisted wire ropes; emitting a first optical signal at a first end of the one or more optical fibers; transmitting the first optical signal through the one or more optical fibers; receiving the first optical signal transmission at a second end of the one or more optical fibers; emitting a second optical signal at the first end of the one or more optical fibers; transmitting the second optical signal through the one or more optical fibers; receiving the second optical signal transmission at the second end of the one or more optical fibers; and monitoring cable integrity by comparing the first optical signal transmission and the second optical signal transmission.

In a variation to the method of monitoring integrity of reinforcing cables, the optical signal is a laser beam. In another variation to the method of monitoring integrity of reinforcing cables, a photodiode is used to receive the optical signal transmissions.

A prestressed concrete structure is disclosed in accordance with other embodiment of the disclosure. The prestressed concrete structure has prestressed concrete, and one or more cables for externally reinforcing the prestressed concrete. Each cable contains a plurality of wire ropes twisted together, each wire rope comprising a plurality of wire strands twisted together, one or more optical fibers entwined with and contacting some of the plurality of twisted wire ropes; and a plastic coating surrounding the cable.

In some embodiments, the prestressed concrete structure may further include two or more bridge beams supporting the prestressed concrete, and two or more anchor plates associated with the two or more bridge beams, wherein the one or more cables are anchored to the two or more anchor plates. In another embodiment, the prestressed concrete structure may further include protective caps covering free ends of the one or more cables.

A method for manufacturing a cable for externally reinforcing a prestressed concrete structure is disclosed in accordance with other embodiment of the disclosure. The method includes: coating a plurality of wire strands with plastic; twisting the plurality of plastic-coated wire strands to form a wire rope; counter-twisting a plurality of wire ropes and one or more optical fibers to form a cable; and coating an outer surface of the cable with a plastic.

In some embodiments, the wire strands are coated with a plastic comprising a polyolefin, nylon or Teflon or a copolymer thereof. In some embodiments, the polyolefin is selected from the group consisting of polyethylene, polypropylene, polybutylene and copolymers thereof. In some embodiments, the plastic further comprises carbon black, an antioxidant, or a combination thereof.

In a variation to the method for manufacturing a cable for externally reinforcing a prestressed concrete structure, any gaps within the cable between the wire ropes and the one or more optical fibers are filled by wrapping the one or more wire ropes and optionally the one or more optical fibers in a nonwoven fabric and coating the nonwoven fabric with a plastic. In another variation to the method for manufacturing a cable for externally reinforcing a prestressed concrete structure, any gaps within the cable between the wire ropes and the one or more optical fibers are filled with a filling agent. In some embodiments, the filling agent may contain epoxy resin, varnish, rosin wax, a gel of petroleum based oil or a combination thereof. In other embodiments, the plastic coating the outer surface of the cable may be polyethylene, polypropylene, polybutylene, nylon, Teflon, and copolymers thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn to cables for externally reinforcing prestressed concrete structures. In certain embodiments, the reinforcing cables include one or more optical fibers that facilitate non-invasive, in situ monitoring of the cable's structural and functional integrity. Also provide herein are methods, systems and devices configured to operate in conjunction with the external reinforcing cables to monitor cable integrity over time. The phrase "in situ monitoring" is used herein to mean assessing signal transmission through the optical fiber(s) in the cable over time, after the cable has been installed on the prestressed concrete structure, without removing or disturbing the cable relative to the concrete structure, without cutting the cable or otherwise invasively examining the cable, or compromising the protective plastic coating surrounding the cable.

In some embodiments, the cable has one or more wire ropes twisted together where each wire rope is formed from a plurality of wire strands twisted together. The cable also contains one or more optical fibers entwined with and contacting at least some of the one or more twisted wire ropes. In some embodiments, each optical fiber contains a core which transmits an optical signal and a cladding around the core. This cable configuration including one or more optical fibers can assist in assessing cable integrity in externally reinforced prestressed concrete by monitoring changes in light transmission through the optical fiber(s) over time. In some embodiments, there is a plastic coating surrounding the outer surface of the cable. In some embodiments, there is a plastic coating surrounding the one or more wire ropes twisted together to form the cable. In some embodiments, there is a plastic coating surrounding the one or more wire strands that are twisted together to form the wire rope(s). The various plastic coatings of the wire components of the cable are believed to enhance endurance of the cable during exposure to environmental conditions.

In some embodiments, a system for non-invasive in situ monitoring of cable integrity in externally reinforced prestressed concrete includes one or more reinforcing cables, each having one or more optical fibers entwined with and contacting at least some of the one or more twisted wire ropes that form the cable. Each optical fiber includes a core that transmits an optical signal and a cladding around the core. Embodiments of the system also include an optical signal transmitter, optically coupled to a first end(s) of the one or more optical fibers. The optical signal transmitter is configured to emit an optical signal into the one or more optical fibers. In some embodiments of the system, there may be more than one signal transmitter optically coupled to the more than one optical fiber. In other embodiments of the system, a beam splitter may be used to direct a single optical signal to multiple optical fibers. Embodiments of the system further include an optical signal receiver, configured to receive the transmitted optical signal. The optical signal receiver may be optically coupled to a second end(s) of the one or more optical fibers. In another embodiment, the system may also include a signal monitor, coupled to the optical signal receiver, and configured to identify changes in signal transmission through the one or more optical fibers.

In some embodiments, a method of monitoring the integrity of reinforcing cables involves providing one or more reinforcing cables, each comprising one or more optical fibers, emitting an optical signal at a first end of the one or more optical fibers, transmitting the optical signal through the one or more optical fibers, receiving the transmitted optical signal at a second end of the one or more optical fibers, and monitoring changes in signal transmission through the one or more optical fibers.

In some embodiments, the method of monitoring may further involve receiving the transmitted optical signal at the first end, the transmitted optical signal being returned to the first end, e.g., using a mirror or other reflective surface. Alternatively, the method of monitoring may further involve receiving either the transmitted optical signal or returned optical signal at any of the plurality of the points of the one or more optical fibers on or between the first and second end. In this manner, it is possible to monitor changes in signal transmission along the plurality of points through the one or more optical fibers.

Reinforcing Cable

Figure 1A:
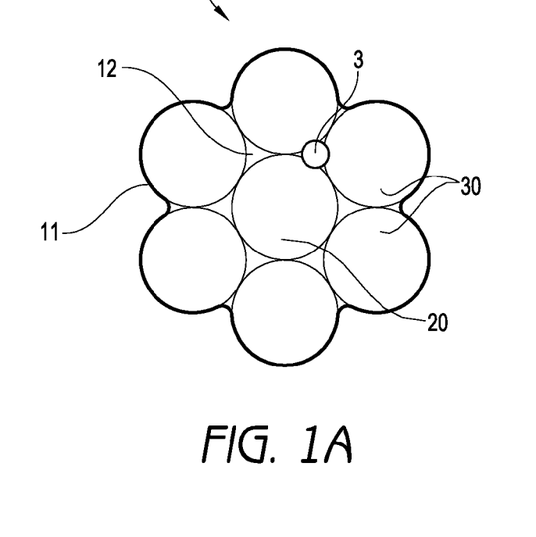
FIG. 1A is a cross-sectional view of an embodiment of a cable for externally reinforcing prestressed concrete, including a plurality of wire ropes twisted together with an optical fiber.
Figure 1B:
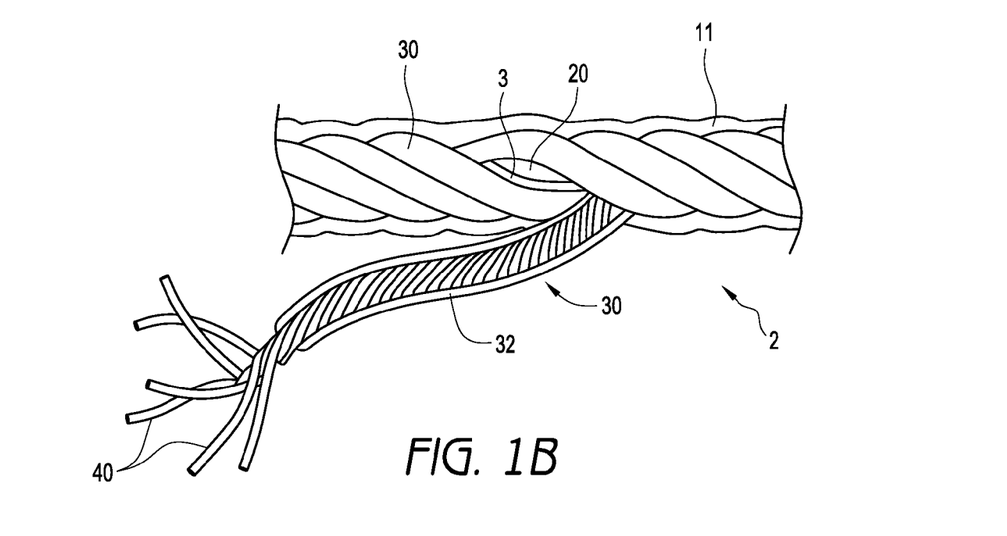
FIG. 1B is a side view of an embodiment of a cable for externally reinforcing prestressed concrete, in which one of the wire ropes is unraveled to illustrate the underlying core rope and optical fiber as well as detail of the unraveled rope construction.

With reference to FIGS. 1A and 1B, an embodiment of a reinforcing cable is illustrated. FIG. 1A is a cross-sectional view showing a number of N wire ropes (N: a natural number) are arranged with a center or core rope 20 and (N−1) outer ropes 30 surrounding the core rope 20. As can be appreciated from FIGS. 1A and 1B, the outer ropes 30 may be laid, braided, plaited, or twisted around the core rope 20. Of course, the total number of ropes N, the number of core ropes and the number of outer ropes may vary. The illustrated embodiment includes a total of seven ropes, with one core rope 20 and six outer ropes 30. If the total number N of wire ropes is seven (as illustrated in FIGS. 1A and 1B) and the diameter of each wire rope is approximately 11.1 mm, an outside diameter of the reinforcing cable 2 will be approximately 33.3 mm. Alternatively, for example, if the total number N of wire ropes is nineteen and the diameter of each wire rope is approximately 9.5 mm, an outside diameter of the reinforcing cable 2 will be approximately 47.5 mm. Of course it is understood that the diameter of the wire ropes themselves, and consequently, the outside diameter of the reinforcing cable may vary.

Figure 1C:
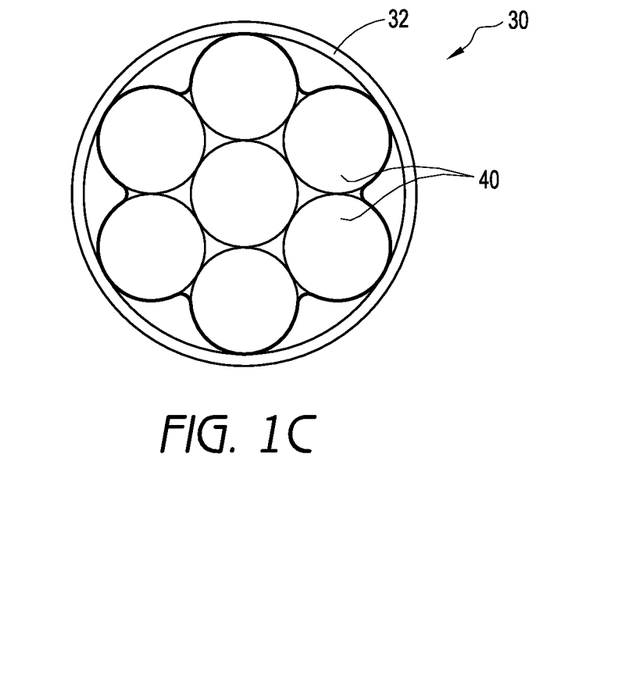
FIG. 1C is a cross-sectional view of one of the outer wire ropes.

In some embodiments, and with reference to FIGS. 1B and 1C, each of the core 20 and/or outer wire ropes 30 may be formed from a plurality of wire strands 40 twisted or braided together. Each wire strand may have a straight solid-core wire or a twisted multi-stranded wire in order to produce increased strength and flexibility. The wire strand can be made, for example, of PC steel wire, PC twisted steel wire, PC hard steel wire and combinations thereof. The wire strands 40 and/or the wire rope 30 may be coated in a plastic, so that the wire strand may be insulated from undesirable moisture, salt, acid or alkaline substances and electricity which may cause corrosion. FIGS. 1B and 1C illustrate a plastic coating 32 around the outer surface of the wire rope 30. This plastic may be selected from polyolefins, nylon, Teflon and combinations and copolymers thereof. Further, the polyolefin may be selected from polyethylene, polypropylene, polybutylene and copolymers thereof. The plastic can further include carbon black, antioxidant, or other UV absorbing or reflecting material, and combinations thereof, in order to prevent oxidization due to sunlight.

Figure 1D:
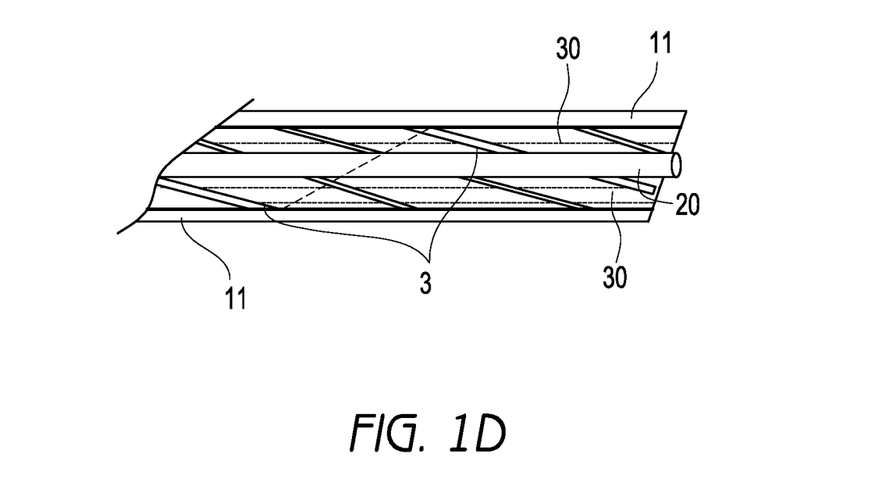
FIG. 1D is an exposed side view of an embodiment of a reinforcing cable showing optical fibers wound around wire ropes within the cable.

As further illustrated in FIGS. 1A and 1B, one or more optical fibers 3 are entwined with at least some of the wire ropes, in such a manner that the one or more optical fibers 3 are contacting at least some of the wire ropes in the cable. In the illustrated embodiment, the optical fiber 3 is arranged between and contacting the core rope 20 and two of the outer ropes 30. With reference to FIG. 1D, an alternative arrangement of the optical fibers and wire ropes is illustrated. Here, two optical fibers 3 are each independently wrapped around an outer rope 30 and also contacting at least the core rope 20. This configuration would be expected to result in the optical fiber contacting the wound outer rope, the two adjacent outer ropes that abut the wound rope, as well as the core rope; thus, four ropes would directly contact the optical fiber. The pitch and winding patterns of the optical fibers around the wire ropes may be varied depending on the actual usage and environment. Other linear or helical arrangements of the one or more optical fibers may be used as long as the reinforcing cable includes at least one optical fiber contacting at least one wire rope.

The optical fibers can be individual fibers. Alternatively, an optical fiber cable which contains one or more individual optical fiber elements can be employed. The one or more optical fiber elements are typically individually coated with plastic layers and contained in a protective tube. Each optical fiber has a transparent core which transmits an optical signal and a transparent cladding around the core. The core and the cladding of each optical fiber can be made of glass or plastic.

In some embodiments, glass optical fibers are typically made of silica. Alternatively, glass optical fibers may contain some other materials, such as fluorozirconate, fluoroaluminate, and chalcogenide glasses, crystalline materials like sapphire for other special purposes. Silica and fluoride glasses usually have refractive indices of about 1.5, but some materials such as the chalcogenides can have indices as high as 3. Typically the index difference between core and cladding is less than one percent. Plastic optical fibers (POF) are typically step-index multi-mode fibers with a core having the diameter of 0.5 millimeters or larger. POF typically have higher attenuation coefficients than glass fibers, 1 dB/m or higher, and this high attenuation limits the range of POF-based systems.

In order to detect slight changes in cable integrity over time, a glass fiber may be preferred for its excellent long-term reliability. Additionally, a single-mode fiber may be desired in some embodiments, due to its smaller transmission loss over long distances and higher sensitivity to lateral pressure applied to the optical fiber, e.g., from the ropes 20 and 30 between which the optical fiber 3 may be sandwiched in the cable 2 (see e.g., the illustrated cable embodiments in FIGS. 1A-1D). However, choice of materials and types of optical fibers are not limited to the above. In fact, optical fibers of various characteristics and various configurations, including the wavelength of the light to be emitted, may be used appropriately in accordance with the intended purpose and environment.

Typically, the cladding is made of material having a lower index of refraction than the index of refraction of the core. Thus, light travelling in the fiber is kept in the core by approximately total internal reflection, where the fiber acts as a waveguide. The optical fiber has a ratio of a refractive index of the core to a refractive index of the cladding of the one or more optical fibers, less than about 1.0%. Typically, the ratio is between about 0.1% and 1.0%. In some embodiments, the ratio is between 0.35% and 0.38%. Furthermore, in some embodiments the ratio ($\Delta$ %) of the refractive indices of the core and cladding may be chosen to be as small as possible; for example, the fiber has a cladding diameter of 80 μm, an external thickness of 125 μm, and a refractive index ratio $\Delta$ of 0.35% to 0.38%. However, these parameters may be selected appropriately in accordance with the usage conditions and environments.

The cladding is usually coated with a primary coating layer of resin, which may be further surrounded by a secondary coating layer of plastic. These layers merely add strength to the fiber but do not improve optical wave guide properties of the fibers. In addition, primary and secondary coating materials for fiber protection are made as thin as possible in some embodiments. It is possible to have light-absorbing glass in dark color between the fibers, to prevent light that may leak out of one fiber from entering another fiber. In this way, cross-talk between the fibers may be reduced.

With reference to FIGS. 1A, 1B and 1D, the outermost layer of cable 2 may be surrounded by a plastic protective coating 11 in order to insulate the reinforcing cable 2 from undesirable moisture, salt, acid or alkaline substances and electricity which may cause corrosion. The plastic material of the plastic protective coating 11 may be made from any art-recognized polymeric material. In some embodiments, the plastic is selected from polyolefins, nylon, Teflon and combinations and copolymers thereof. Further, the polyolefin(s) may be selected from polyethylene, polypropylene, polybutylene and copolymers thereof. The plastic material can further include carbon black, antioxidants, or other UV absorbing or reflecting material, and combinations thereof, in order to prevent damage to a passivation layer formed on the surfaces of the wire ropes, including oxidization due to sunlight, of $CO_2$ and/or $Cl^-$ and secular degradation due to exposure to the outdoor atmosphere after installation of the external reinforcing cable 2. In another embodiment, as illustrated in FIG. 1C, the wire ropes 20 and/or 30 may also be coated with a protective layer 32 of the plastic. The same plastics and additives listed above in regard to the outer coating on the cable may be used for the outer coating of the individual wire ropes that form the cable.

Furthermore with reference to FIG. 1A, gaps 12 between the wire ropes 20 and 30 that form the cable 2 can be filled in various ways. For example, the gaps 12 can be filled with a filling agent, such as epoxy resin, varnish, rosin wax, a gel of petroleum based oil or a combination thereof. The filling agent can further include silica for adjusting consistency across the cable. In addition, the filling agent may further include sodium salt for adjusting an acid value.

Instead of filling the gaps with a filling agent, it is also possible in other embodiments to fill the gaps between the one or more wire ropes 20 and 30 and the one or more optical fibers 3 by wrapping or otherwise encasing the wire ropes and the optical fibers in elastic or supple layers of material, for example, a nonwoven fabric further coated with plastic. The gaps may thus be filled simply by compression during winding of the ropes to form the cable.

System for Monitoring Cable Integrity in a Prestressed Concrete Structure

Figure 2:
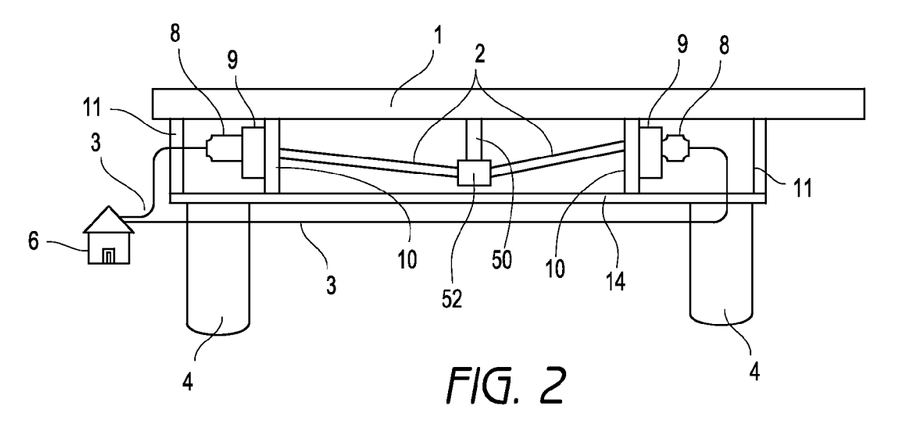
FIG. 2 is a schematic side view of an embodiment of a system for in situ monitoring of the integrity of external reinforcing cables installed in a prestressed concrete structure.

Referring to FIG. 2, a sectional view of one embodiment of a prestressed concrete structure having an external reinforcing cable is illustrated; many of such concrete structures may be coupled e.g., to span an entire bridge or roadway. The concrete 1 is supported in the illustrated embodiment by main bridge beams 11 and intermediate bridge beams 10, both of which extend between the concrete 1 and a base member 14. The whole prestressed concrete structure may be supported, as shown, by bridge columns 4. The concrete structure also includes a cable 2 that is external to the concrete. In the illustrated embodiment, the cable 2 is anchored by anchor plates 9 to the intermediate bridge beams 10. In some embodiments, as illustrated, the end of the cable extends through the anchor plate 9 and is covered by a protective end cap 8.

Figure 3:
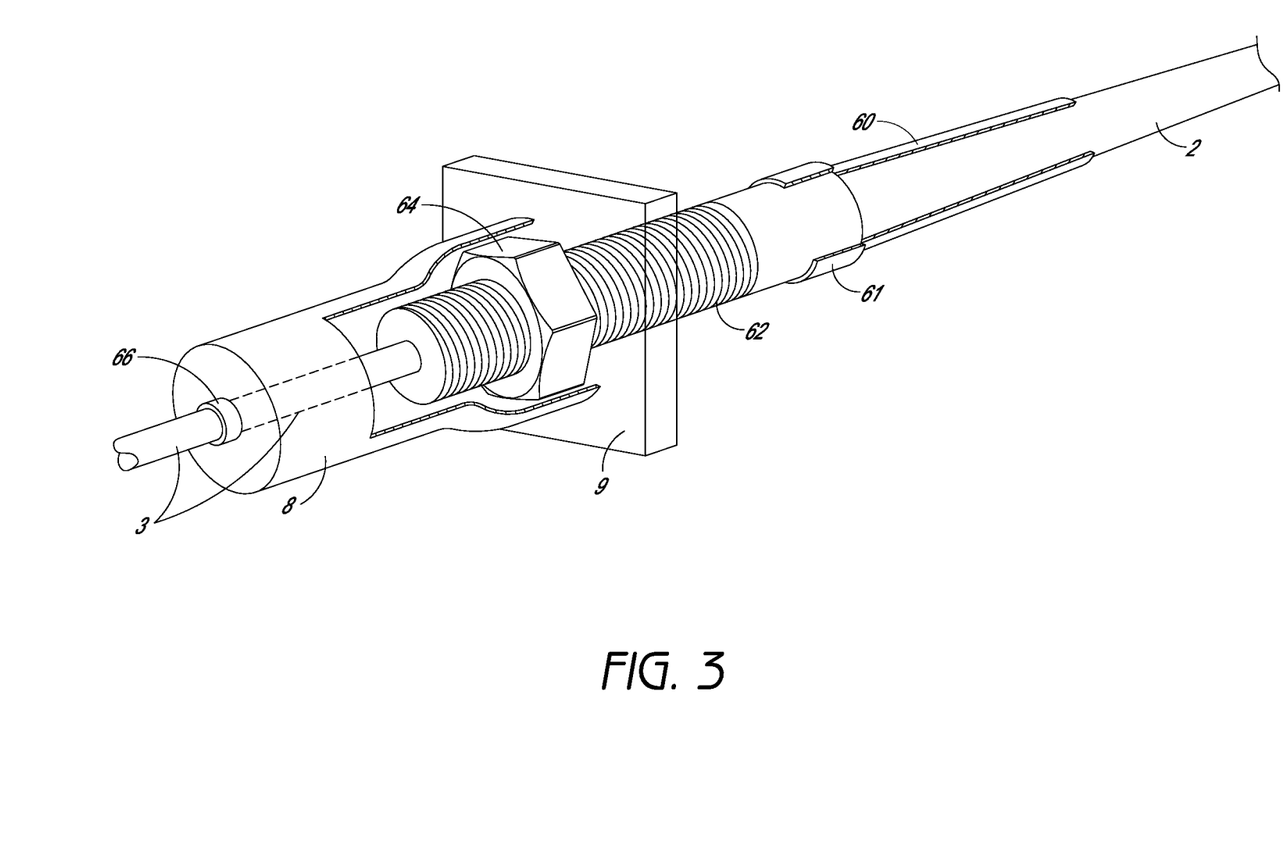
FIG. 3 is an exposed perspective view of an embodiment of an anchoring mechanism, showing adjustable anchoring of a cable to an anchoring plate and a protective end cap.

One embodiment of the anchoring mechanism is illustrated in FIG. 3, where the cable 2 is securely engaged within a step-wise tapered collar 60, which is coaxially engaged within a cover sleeve 61. The cover sleeve 61 has a threaded end region 62. After passing through a receiving hole (not shown) in the anchor plate 9, a nut 64 is tightened onto the threaded end region to anchor the cable 2 to the anchor plate 9. A protective end cap 8 is further shown covering the threaded end region 62 of the cable and the nut 64. At least a portion of the one or more optical fibers 3 that run through the cable (as detailed above), extend beyond the end region 62 of the cable and passes through an aperture 66 in the protective end cap 8; in some embodiments, the aperture 66 comprises a seal to protect the end of the cable from environmental exposure.

Referring again to FIG. 2, disposed between the intermediate bridge beams 10 is a deflector 50 which has a cable guide member or duct 52 through which the cable passes. The deflector 50 creates an angle or bending radius in the external cable 2 such that the tightened cable may exert a force on the concrete slab 1. Although many embodiments of prestressed concrete structures utilize a deflector structure and/or guide member to create a bending radius in the cable as illustrated in FIG. 2, other embodiments of prestressed concrete structures utilize linear cable arrangements, where force is exerted by the cable in a linear direction (e.g., perpendicular to or parallel to the concrete slab). The particular configuration shown in FIG. 2 of the concrete supporting members, cables, beams, deflectors and anchors is not limiting on the scope of the appended claims.

With reference to FIGS. 2 and 3, at least a portion of the one or more optical fibers 3 within the cable 2 extend beyond the ends of the cable. In the illustrated embodiments, the optical fiber 3 extends through respective first and second ends of the cable 2 and through the respective first and second protective end caps 8. In some embodiments, the optical fiber passes through a seal in the end cap, thereby insulating the protected cable end from exposure to the environment. While the end caps and apertures are depicted in FIGS. 2 and 3, these elements are not necessary for operability of the monitoring system.

The optical fiber 3 that extends from each of the protective end caps 8 in FIG. 2 is coupled to an optics management system 6, which includes an optical signal generator (for introducing a light signal at a first end of the optical fiber), an optical signal receiver (for receiving the transmitted light signal at a second end of the optical fiber), and an optical signal monitor (for monitoring changes in light transmission through the optical fiber, data processing and reporting). The optics management system 6 may be housed in a single unit, as illustrated in FIG. 2, or may include separate, operably coupled, components that may or may not be separated from one another.

Figure 4:
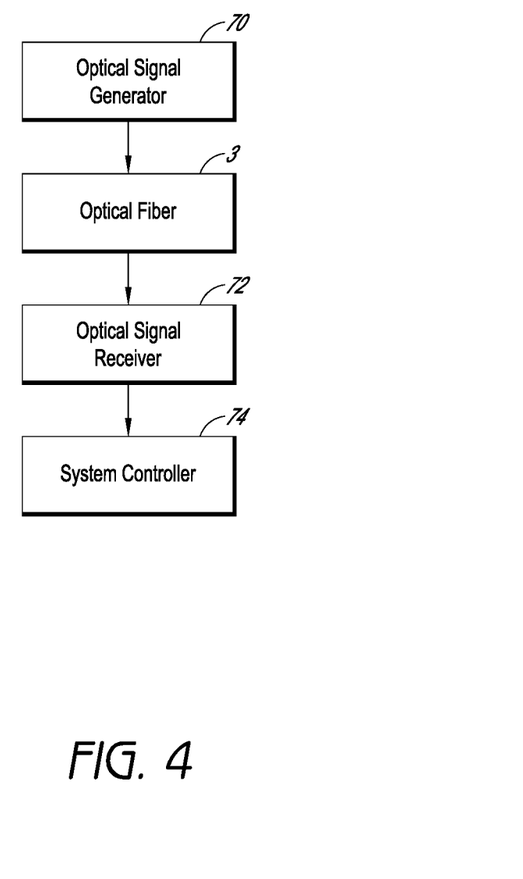
FIG. 4 is a chart showing the arrangement and coupling of the components of the optical system for in situ monitoring of cable integrity.

As illustrated in FIG. 4, the optical signal generator 70 is optically coupled via the one or more optical fiber(s) 3 in the cable to the optical signal receiver 72. The optical signal receiver is coupled directly (e.g., wired) or remotely (e.g., radiofrequency) to the optical signal monitor or controller 74. The monitor 74 may include a microprocessor or conventional computer, or in some embodiments, the monitoring, processing and reporting functions may be divided among two or more distinct subunits that are operably coupled, but not necessarily physically coupled. In some embodiments, as illustrated in FIG. 4, the optical signal monitor 74 may communicate with and/or exert control over the optical signal generator 70. For example, as described in more detail below, the monitor may change the interrogation rate, such that an apparent transmission loss indicative of cable degradation could be rapidly re-tested to determine if the reading was aberrant. In some embodiments, the receiver 72 is directly connected to the monitor 74, while in other embodiments, the receiver communicates to a central, remotely located monitor (e.g., via radiofrequency transmission).

The optical signal generator (sometimes also referred to as an optical signal emitter) 70 is optically coupled to the first end(s) of the one or more optical fibers, such that the light emitted by the optical signal generator enters the optical fiber(s) and is propagated therethrough. The optical signal generator may include optical filters, collimator lenses, etc. The most commonly-used optical signal generators are semiconductor devices such as light-emitting diodes (LEDs) which emit incoherent light and laser diodes which emit coherent light. In one embodiment, a semiconductor laser is used as the optical signal generator which emits a laser beam as the optical signal, due to stimulated emission which results in high output power related to the nature of coherent light. The coherent light emitted at the laser is relatively directional, thus it allows high coupling efficiency when used together with single-mode fiber. In one embodiment, the laser beam has a wavelength of about 0.01 to 10 μm. In other embodiments, the laser beam has a wavelength of greater than 1 μm. In yet another embodiment, the laser beam has a wavelength of about 1.55 μm.

An optical signal receiver 72 is coupled to the one or more optical fibers at the other (second) end. The optical signal receiver receives the optical signal that is transmitted through the one or more optical fibers. In some embodiments, the optical signal receiver may include optical filters, detectors, amplifiers, etc. Typically, a photodiode, capable of converting the optical signal into an electronic signal by converting light into either current or voltage, is used as the optical signal receiver in order to receive the transmitted optical signal. Choice of material to be used for a photodiode can be critical to defining physical properties of the photodiode, because photons with sufficient energy to excite electrons across the material's band gap are able to generate significant photocurrents. Materials commonly used in photodiodes can be Silicon (Si), Germanium (Ge), Indium gallium arsenide and Lead(II) sulfide.

The optical signal monitor or controller 74 is coupled to the optical signal receiver 72 by a wired or wireless connection. In some embodiments the monitor 74 and receiver 72 are hardwired and physically housed in the same unit. In some embodiments, the monitor 74 and receiver 72 are remotely located and communicate via a wireless connection. The signal monitor 74 may be further coupled via wire or wireless connection to the optical signal generator 70, thereby providing control of interrogation (emission and reception operations). In some embodiments, the monitor is a computer or has computing capability, for comparing signal transmission between first and second times, or in other embodiments, the monitor is coupled to a remote computing device. In some embodiments, the various functionalities of the monitor may be integrated into one unit or spread among several operably coupled units. In some embodiments, the signal monitor may further include a display, a printer, a transmitter, or an alarm. Moreover, any well known monitor for measurement of transmission loss received at the optical fiber may be included in the one or more units, and hence a detailed description thereof is omitted.

Method for Monitoring Cable Integrity in a Prestressed Concrete Structure

Despite protection by plastic layer(s), the external reinforcing cable 2 may still incur some loss in structural and functional integrity due to exposure to the sun, environmental conditions, temperature extremes, and atmospheric gases and chemicals after installation. For example, plastic materials may develop cracks in the protective coating as a result of many different natural causes that accelerate deterioration, such as heat, moist, ultraviolet rays from the sun and oxidation due to nitrogen oxide ($NO_R$) gas or sulfur oxide ($SO_x$) gas in the atmosphere, as well as human-induced causes, such as mechanical damage. As carbon dioxide gas, chloride ions, etc. permeate the external reinforcing cable 2 through cracks in the protective coatings, the wire ropes may become corroded by carbon dioxide gas, chloride ions, etc. The corrosion and rust can cause the expansion of the volume of the passivation layer on the steel wire ropes by approximately two to three times. Consequently, the volume of the core and outer wire ropes (20 and 30, respectively) may expand. The expansion of the wire ropes will impart increased lateral pressure on the optical fiber(s) 3 in contact with and sandwiched between the wire ropes. As a result of the increased lateral pressure, the fiber(s) may flex and bend, resulting in decreased light transmission through the optical fiber(s) 3. Thus, by monitoring changes in transmission rate of optical signals through the optical fiber(s) 3, it is possible to monitor secular degradation of the wire ropes in situ (without destroying, compromising or taking the cable out of service).

To provide empirical support for the underlying basis of the described method for monitoring cable integrity, a light signal may be introduced into a first end of an optical fiber. In some embodiments, the wavelength the light signal may be 1.55 µm for a single mode fiber, or 0.98 µm for a multi-mode fiber. The light signal may be either a continuous or intermittent signal.

There is no specific constraint for duration of the emitted light signal or the time between light signals. In one embodiment, it is possible to have an emitted light signal with duration of about one second, or about one minute, etc. In one embodiment, it is possible to monitor several initial states of measurement during an initial phase immediately after the installation of the reinforcing cable if the prestressed concrete structure is relatively new. After a lapse of the initial phase, it is possible to monitor the transmission loss with an intermittent light of a preset period. In one embodiment, a continuous signal may be used for monitoring, if a loss in transmission is detected over time, any change in a signal degradation rate is observed, or the prestressed concrete structure is relatively old and frequent monitoring of degradation is appropriate.

The increase of the lateral pressure of the reinforcing cable may vary according to traffic of either bridge or roadway where this reinforcing cable is installed. Thus, the signal loss may vary due to the traffic, accordingly. In one embodiment, where the traffic tends to be heavy, it is possible to have an intermittent signal with a period between signals of about one week, or about a few days. In one embodiment, where the traffic is relatively light, the intermittent signal may have a period between signals of about one month, about three months, about half a year, or about one year, etc. Also, the time interval between emitted light signals may vary depending on many other factors, including for example, the age of the cable, the season, etc. The time interval may be set to absorb the fluctuation of the signal due to these factors.

The monitoring conditions and environments may change according to seasons. In one embodiment, it is possible to prestore monitoring conditions and environments which change due to the seasons, so that it is possible to calibrate monitoring processes and to correct the measured values. Because signal changes due to the seasonal changes and signal changes due to the transmission loss manifest in different manners, it is possible to detect the transmission loss separately from the signal changes due to the seasonal changes.

In one embodiment, the fiber has a cladding diameter of 80 µm, and an external thickness of 125 µm. The kind and size of protective layer may vary. In one embodiment, the fiber may have a combination of core, a cladding member, and a primer layer may include silicon or urethane with a thickness of about 10-99 µm, and a combination of a coating layer and an outer skin protective layer, including nylon or polyethylene with a thickness of 1 mm to 3 mm. The length of the fiber in the cable may be selected accordingly to the distance of cables to be monitored.

The transmission of the light signal is measured using an optical signal receiver coupled to the second end of the optical fiber. The optical signal transmitted from the laser propagates in the optical fiber after being amplified. The optical signal is received at a photo detector, and converted into an electrical signal, and is monitored at the transmission loss monitor aforementioned.

Figure 5:
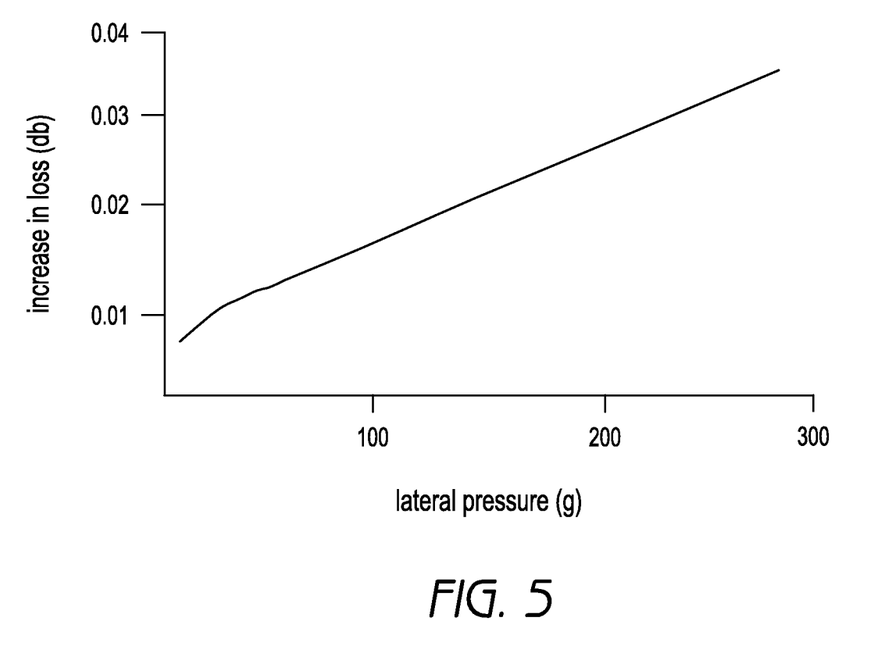
FIG. 5 is a graph showing an increase in transmission loss through an optical fiber with increased lateral pressure.

Variable amounts of lateral pressure, between 0-300 grams, were applied to the fiber and then the transmission was measured. As shown in FIG. 5, transmission loss (db) of an optical signal through the optical fiber increased as the amount of lateral pressure (g) applied to the fiber was increased. These results provide support for the described method for in situ monitoring of cable corrosion/degradation by monitoring loss in light transmission through one or more optical fibers running between and contacting the wire ropes within the cable.

Accordingly, the method of monitoring integrity of reinforcing cables used for externally reinforcing a prestressed concrete structure, involves providing one or more reinforcing cables, each reinforcing cable comprising one or more wire ropes twisted together, and one or more optical fibers entwined with and contacting at least some of the one or more twisted wire ropes, emitting an optical signal at a first end of the one or more optical fibers at a first time (e.g., $T_1$), transmitting the optical signal through the one or more optical fibers, receiving the transmitted optical signal at a second end of the one or more optical fibers, repeating the emitting and receiving steps at a second time ($T_2$), and monitoring changes between $T_1$ and $T_2$ in signal transmission through the one or more optical fibers. Of course, the optical interrogation (i.e., the emitting and receiving steps) will, in some embodiments, be repeated at regular intervals during the service lifetime of the cable. Because the service lifetime of the reinforcing cables described herein may span decades, optical interrogation may practically be determined, e.g., once an hour, once a day, once a month, once every 2 months, once every 6 months, once a year, once every 2 years, once every 3 years, once every 4 years, once every 5 years, etc. If a loss in transmission is detected over time, the interrogation interval may be shortened to more closely monitor cable degradation and/or to identify possible aberrant causes for a transmission loss (e.g., transient changes in loading of the concrete structure). In some embodiments of the monitoring method, a threshold transmission loss value is selected (e.g., based on empirical data relating transmission loss to functional/structural integrity of the cable), so as to trigger e.g., further testing, increased optical interrogation rate, or an alarm function. In some embodiments, the monitor or system controller 74 includes a memory for storing signal transmission data over time, and a program for automating the above detailed methods. In some embodiments, the monitor or system controller 74 may further include a display, a printer, a transmitter, or an alarm. Moreover, any well known monitoring method for measurement of transmission loss received at the optical fiber may be included in the one or more units, and hence a detailed description thereof is omitted.

Method of Manufacturing Cables

A method for manufacturing a cable for externally reinforcing a prestressed concrete structure is further described herein. Wire ropes are made by twisting or braiding a plurality of wire strands, as is known in the art. Each wire strand may have a straight solid-core wire or a twisted multi-stranded wire. The wire strand can be made, for example, of PC steel wire, PC twisted steel wire, PC hard steel wire and combinations thereof. The plurality of wire strands may optionally be coated with plastic by extruding in such a manner that the wire strands may be insulated from undesirable moisture, salt, acid or alkaline substances and electricity which may cause corrosion. The plurality of wire strands may optionally be coated by spraying or dipping, alternatively. The plastic for coating the plurality of wire strands may contain a polyolefin, nylon or Teflon or a copolymer thereof. Further, the polyolefin may be selected from the group consisting of polyethylene, polypropylene, polybutylene and copolymers thereof. The plastic may further include an agent for preventing or inhibiting light induced damage/oxidation, such as carbon black, UV-absorbing or reflecting species such as a benzophenone group or a triazine group, antioxidants such as a phenol group, a phosphate group, or a sulfur group, or a combination thereof.

A plurality of wire ropes made of the plurality of wire strands, and one or more optical fibers are then twisted together to form a cable. In some embodiments, the twist of the ropes is opposite to that of the strands. With this counter-twist, introduced with each successive twisting operation, the final cable tends to retain a stable configuration.

As a result of twisting the one or more optical fibers with at least some of the one or more twisted wire ropes, the one or more optical fibers are contacting at least some of the one or more twisted wire ropes to form the external reinforcing cable. Each optical fiber can be either made of glass or plastic.

In some embodiments, glass optical fibers are typically made of silica. Alternatively, glass optical fibers may be made of some other materials, such as fluorozirconate, fluoroaluminate, and chalcogenide glasses, crystalline materials like sapphire, for other special purposes. Typically the index difference between core and cladding is less than one percent. Plastic optical fibers (POF) can be made of fluorocarbon polymers, acrylic resin such as polymethyl methacrylate, polycarbonate, polystyrene. POF typically have higher attenuation coefficients than glass fibers, 1 dB/m or higher, and this high attenuation limits the range of POF-based systems. To monitor slight changes in the reinforcing cable in the monitoring system, a glass fiber, possibly of a single-mode which transmits only a single ray of light may be preferable to be used, due to its smaller transmission loss suitable for long distance transmissions and higher sensitivity to lateral pressure applied to the fiber. However, choice of materials and types of optical fibers are not limited to the above.

Each optical fiber has a transparent core which transmits an optical signal and a transparent cladding around the core. Typically, the cladding is made of material having a lower index of refraction than the index of refraction of the core. To increase the index of refraction, Germanium (Ge) or Phosphorus (P) may be added to the core. In contrast, Boron (B) or Fluorine (F) can be added to the cladding. Thus, light travelling in the fiber is kept in the core by approximately total internal reflection, where the fiber acts as a waveguide. The optical fiber has a ratio of a refractive index of the core to a refractive index of the cladding of the one or more optical fibers, less than about 1.0%. Typically, the ratio is between about 0.1% and 1.0%. Ideally, the ratio is between 0.35% and 0.38%. Furthermore, it is preferable that the ratio (A %) of the refractive indices of the core and cladding be as small as possible; for example, the fiber has a cladding diameter of 80 µm, an external thickness of 125 µm, and a refractive index ratio Δ of 0.35% to 0.38%. The laser used has a wavelength of 1.55 µm. However, these parameters may be selected appropriately in accordance with the usage conditions and environments.

Gaps between the outer plastic layer, the wire ropes and the optical fibers can be filled. In some embodiments, the gaps between the wire ropes and the one or more optical fibers can be filled by wrapping the one or more wire ropes and the one or more optical fibers in nonwoven fabric and coating with plastic around the nonwoven fabric. The nonwoven fabric can be made of polymer, such as polyethylene, polypropylene etc.

In some embodiments, the gaps within the cable between the wire ropes and the one or more optical fibers can be filled with a filling agent, such as epoxy resin, varnish, rosin wax, a gel of petroleum based oil or a combination thereof, for example. The filling agent can further include silica for adjusting consistency across the cable. In addition, the filling agent may further include sodium salt for adjusting an acid value. In one embodiment, the filling agent is injected in the gaps within the cable between the wire ropes and the one or more optical fibers from one point toward both sides of the longitudinal direction within the cable, whereby the gaps are filled therewith to the vicinity of the wire ropes and the one or more optical fibers. A slight gap between the surface of the cable, the wire ropes and the one or more optical fibers may remain. Usually, the air pushed away to the vicinity of the coatings of the wire ropes and the one or more optical fibers due to the injection of the filling agent is expelled to the outside through the above-mentioned gaps, whereby the gaps are completely filled with the filling agent to the vicinity of wire ropes and the one or more optical fibers. In one embodiment, the filling agent is an UV-curable resin. When the surroundings of the wire ropes and the one or more optical fibers are sufficiently filled with the UV-curable resin, an ultraviolet light is emitted from therebelow, whereby the filling UV-curable resin is cured with the ultraviolet light.

Once the gaps within the cable between the wire ropes and the one or more optical fibers are filled, an outer surface of the external reinforcing cable may be surrounded by a plastic protective coating in order to insulate the external reinforcing cable from undesirable moisture, salt, acid or alkaline substances and electricity which may cause corrosion. The plastic material of the plastic protective coating may be selected from polyolefins, nylon, Teflon and copolymers thereof. Further, the polyolefin may be selected from polyethylene, polypropylene, polybutylene and copolymers thereof. The plastic material can further include carbon black, antioxidant, and a combination thereof, in order to prevent damage to a passivation layer formed on the surfaces of the twisted wire ropes, including oxidization due to sunlight, of $CO_2$ and/or $Cl^-$ and secular degradation due to exposure to the outdoor atmosphere after installation of the external reinforcing cable. In yet another example (not shown), the wire ropes may be coated with a protective layer of the plastic as listed above.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A reinforcing cable for prestressing a concrete structure, the cable comprising:
   a plurality of wire ropes twisted together, each wire rope of the plurality of wire ropes comprising a plurality of wire strands twisted together, the plurality of wire ropes including:
      a center wire rope of the plurality of wire ropes, the center wire rope being positioned substantially in the center of the reinforcing cable; and
      a plurality of outer wire ropes of the plurality of wire ropes, which are one or more of laid, braided, plaited, or twisted around the center wire rope; and
   one or more optical fibers positioned at one or more off-centered positions and entwined with and contacting at least some of the plurality of wire ropes, each optical fiber comprising a core configured to transmit an optical signal and a cladding around the core,
wherein the plurality of wire strands is selected from the group consisting of Prestressed Concrete (PC) steel wire, PC twisted steel wire, PC hard steel wire, and any combination thereof.

2. The reinforcing cable of claim 1, further comprising a plastic coating surrounding the cable.

3. The reinforcing cable of claim 1, wherein each wire strand comprises a straight solid-core wire or a twisted multi-stranded wire.

4. The reinforcing cable of claim 3, wherein the plastic is selected from the group consisting of polyolefins, nylon, Teflon and copolymers thereof.

5. The reinforcing cable of claim 3, wherein the plastic further comprises carbon black, an antioxidant, or a combination thereof.

6. The reinforcing cable of claim 1, wherein at least one wire strand is coated with plastic.

7. The reinforcing cable of claim 6, wherein the polyolefin is selected from the group consisting of polyethylene, polypropylene, polybutylene and copolymers thereof.

8. The reinforcing cable of claim 1, further comprising a nonwoven fabric wrapped around the plurality of wire ropes and optionally the one or more optical fibers, and a plastic coating around the nonwoven fabric.

9. A reinforcing cable for prestressing a concrete structure, the cable comprising:
a plurality of wire ropes twisted together, each wire rope of the plurality of wire ropes comprising a plurality of wire strands twisted together, the plurality of wire ropes including:
a center wire rope of the plurality of wire ropes, the center wire rope being positioned substantially in the center of the reinforcing cable; and
a plurality of outer wire ropes of the plurality of wire ropes, which are one or more of laid, braided, plaited, or twisted around the center wire rope; and
one or more optical fibers entwined with and contacting at least some of the plurality of wire ropes, each optical fiber comprising a core configured to transmit an optical signal and a cladding around the core,
further comprising a filling agent in the gaps between the plurality of wire ropes and the one or more optical fibers.

10. The reinforcing cable of claim 9, wherein the filling agent comprises epoxy resin, varnish, rosin wax, a gel of petroleum based oil or a combination thereof.

11. The reinforcing cable of claim 9, wherein the filling agent further comprises silica.

12. The reinforcing cable of claim 9, wherein the filling agent further comprises sodium salt.

13. The reinforcing cable of claim 12, wherein the plastic coating further comprises carbon black, an antioxidant, or a combination thereof.

14. The reinforcing cable of claim 9, wherein the plastic coating surrounding the cable is selected from the group consisting of polyolefins, nylon and Teflon and copolymers thereof.

15. The reinforcing cable of claim 9, wherein a ratio of a refractive index of the core to a refractive index of the cladding of the one or more optical fibers is less than about 1.0%.

16. The reinforcing cable of claim 15, wherein the ratio is between about 0.1% and 1.0%.

17. The reinforcing cable of claim 15, wherein the ratio is between 0.35% and 0.38%.

18. The reinforcing cable of claim 9, wherein the cable comprises from 1-18 twisted wire ropes.

19. The reinforcing cable of claim 9, wherein the cable comprises 6 outer wire ropes surrounding 1 central core wire rope.

20. A system for monitoring in situ integrity of externally reinforced prestressed concrete, the system comprising:
one or more reinforcing cables, each reinforcing cable comprising:
a plurality of wire ropes twisted together, each wire rope of the plurality of wire ropes comprising a plurality of wire strands twisted together, the plurality of wire ropes including:
a center wire rope of the plurality of wire ropes, the center wire rope being positioned substantially in the center of the reinforcing cable; and
a plurality of outer wire ropes of the plurality of wire ropes, which are one or more of laid, braided, plaited, or twisted around the center wire rope; and
one or more optical fibers positioned at one or more off-centered positions and entwined with and contacting at least some of the plurality of wire ropes, each optical fiber comprising a core configured to transmit an optical signal and a cladding around the core;
an optical signal transmitter configured to emit an optical signal at a first end of the one or more optical fibers at a first time and a second time;
an optical signal receiver configured to receive the optical signal at a second end of the one or more optical fibers; and
a signal monitor, coupled to the optical signal receiver, and programmed to assess integrity of the plurality of wire ropes by:
receiving a first optical signal transmitted through the one or more optical fibers at the first time;
receiving a second optical signal transmitted through the one or more optical fibers at the second time; and
comparing the first optical signal received at the first and the optical signal received at the second times.

21. The system of claim 20, wherein each reinforcing cable further comprises a plastic coating surrounding the cable.

22. The system of claim 20, wherein the optical signal transmitter comprises a laser.

23. The system of claim 20, wherein the optical signal receiver comprises a photodiode.

24. The system of claim 20, wherein the signal monitor is further configured to control the optical signal generator and automatically monitor signal transmission over time.

25. The system of claim 20, wherein the signal monitor is coupled to the signal receiver by a wire or by a wireless connection.

26. The system of claim 20, wherein the signal monitor further comprises at least one output device selected from the group consisting of a display, a printer and an alarm.

* * * * *

UNITED STATES PATENT AND TRADEMARK OFFICE
CERTIFICATE OF CORRECTION

PATENT NO. : 9,575,271 B2
APPLICATION NO. : 14/000198
DATED : February 21, 2017
INVENTOR(S) : Fuse It is certified that error appears in the above-identified patent and that said Letters Patent is hereby corrected as shown below:

On the Title Page

In item (75), under "Inventors", in Column 1, Line 1, delete "Fuse," and insert -- Fuse, deceased, --, therefor.

In the Specification

In Column 1, below Title, insert -- CROSS-REFERENCE TO RELATED APPLICATION --.

In Column 1, Line 64, delete "($NO_R$)" and insert -- ($NO_x$) --, therefor.

In Column 7, Line 65, delete "(A %)" and insert -- ($\Delta$ %) --, therefor.

In Column 11, Line 14, delete "($NO_R$)" and insert -- ($NO_x$) --, therefor.

In Column 14, Line 18, delete "(A %)" and insert -- ($\Delta$ %) --, therefor.

Signed and Sealed this
Second Day of May, 2017

Michelle K. Lee
*Director of the United States Patent and Trademark Office*